(No Model.) 3 Sheets—Sheet 1.

J. A. CHILDS & W. E. MUIR.
SEED PLANTER AND FERTILIZER DISTRIBUTER.

No. 411,215. Patented Sept. 17, 1889.

WITNESSES:
Fred G. Dieterich
P. B. Turpin

INVENTORS
J. A. Childs
W. E. Muir
BY Munn & Co.
ATTORNEYS.

(No Model.) 3 Sheets—Sheet 2.
J. A. CHILDS & W. E. MUIR.
SEED PLANTER AND FERTILIZER DISTRIBUTER.
No. 411,215. Patented Sept. 17, 1889.
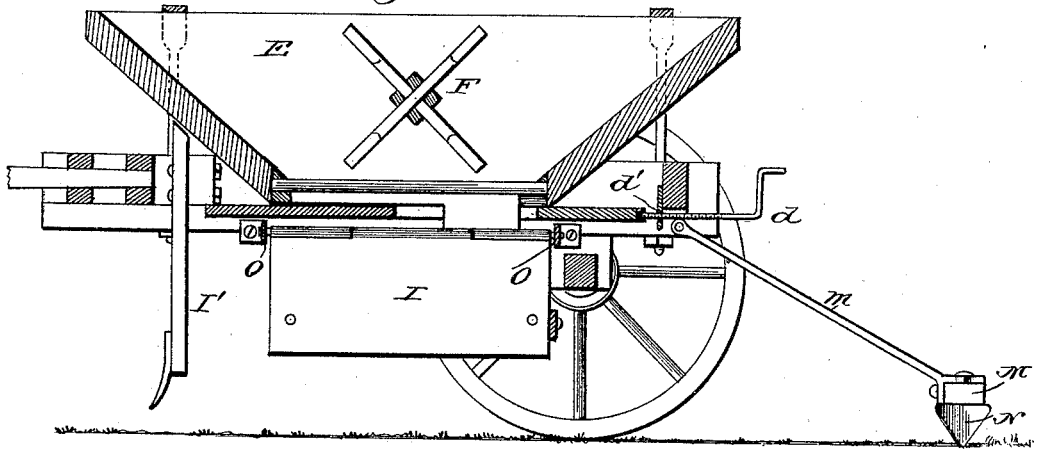
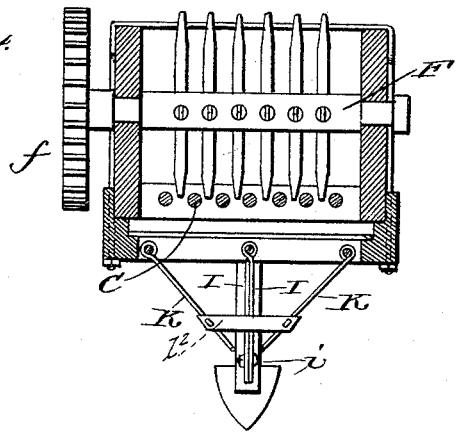
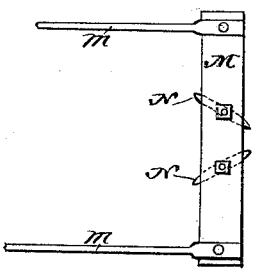
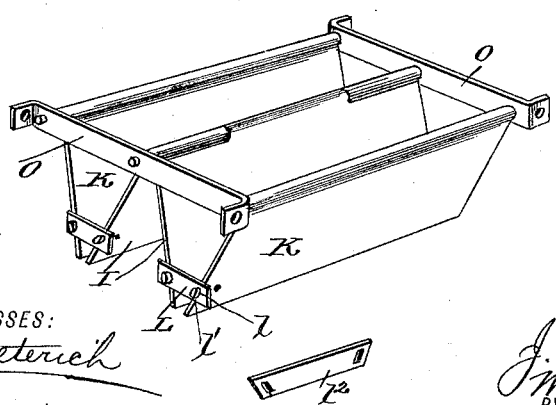
WITNESSES:
INVENTORS
J. A. Childs
W. E. Muir
BY
Mann
ATTORNEY (No Model.) 3 Sheets—Sheet 3.

J. A. CHILDS & W. E. MUIR.
SEED PLANTER AND FERTILIZER DISTRIBUTER.

No. 411,215. Patented Sept. 17, 1889.

WITNESSES:
Fred G. Dieterich
P. B. Turpin

INVENTORS
J. A. Childs
W. E. Muir
BY Munn & Co.
ATTORNEYS.

UNITED STATES PATENT OFFICE.

JESSIE ALFRED CHILDS AND WILLIAM EDWARD MUIR, OF COUSHATTA, LOUISIANA.

SEED-PLANTER AND FERTILIZER-DISTRIBUTER.

SPECIFICATION forming part of Letters Patent No. 411,215, dated September 17, 1889.

Application filed January 22, 1889. Serial No. 297,169. (No model.)

*To all whom it may concern:*

Be it known that we, JESSIE ALFRED CHILDS and WILLIAM EDWARD MUIR, of Coushatta, in the parish of Red River and State of Louisiana, have invented a new and useful Improvement in Seed-Planters and Fertilizer-Distributers, of which the following is a specification.

This invention is an improvement in seed-planters and fertilizer-distributers; and it consists in certain features of construction and novel combinations of parts, as will be described and claimed.

Figure 1:
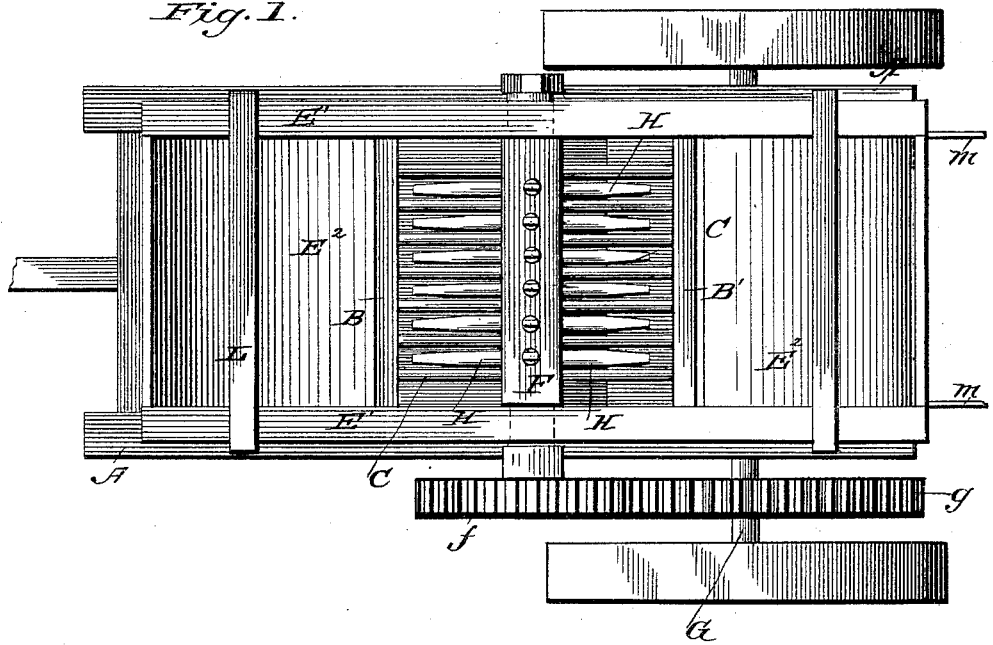
Figure 2:
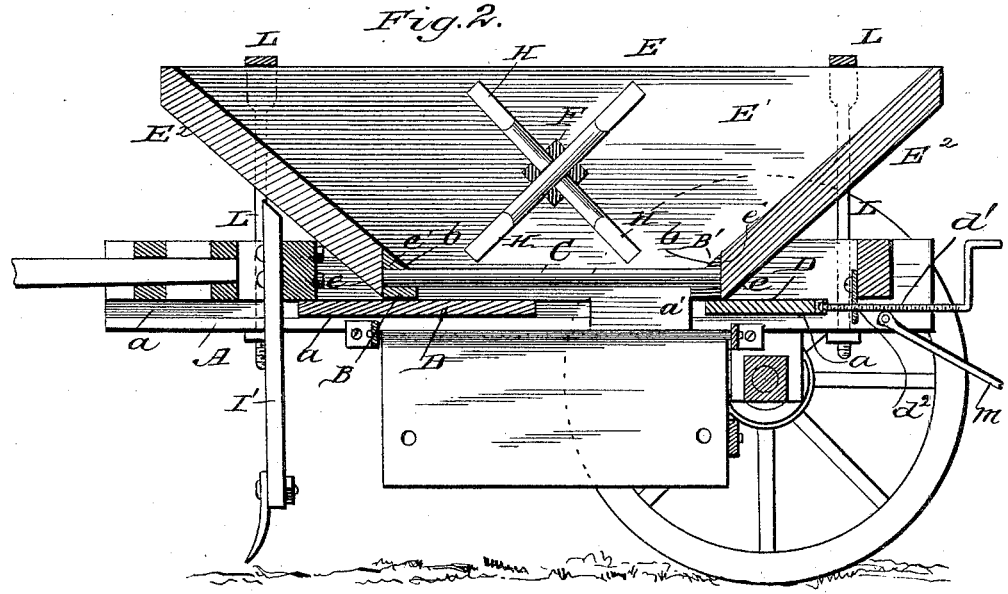
Figure 7:
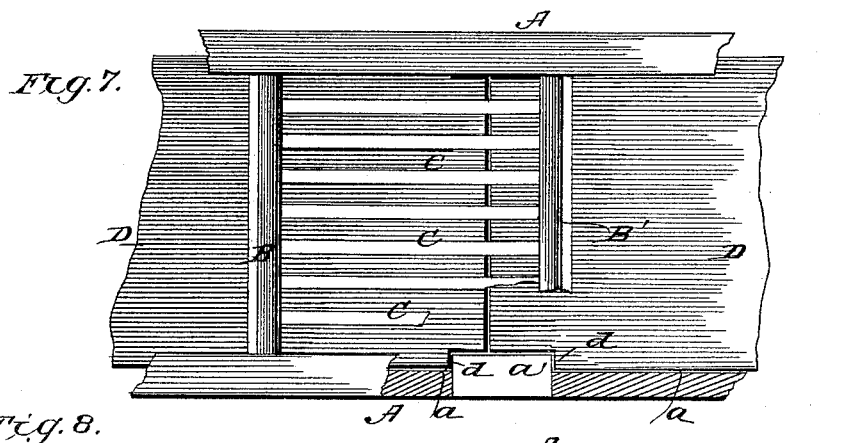
Figure 8:
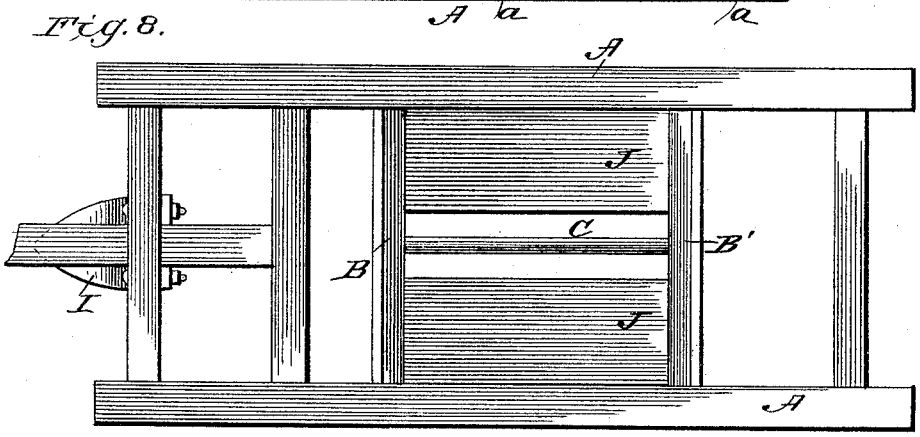
Figure 9:
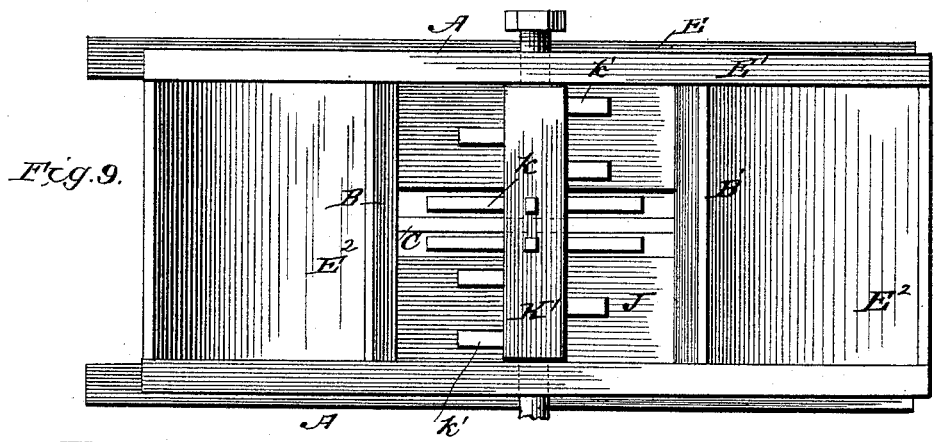

In the drawings, Figure 1 is a top view; Fig. 2, a partial vertical longitudinal section of the machine. Fig. 3 is a vertical section of the machine on a somewhat smaller scale than Fig. 2. Fig. 4 is a vertical cross-section. Fig. 5 is a detail view of the drill-boards. Fig. 6 is a detail plan view of the cover. Fig. 7 is a detail plan view of a part of the main frame, showing the slat-rods and the regulating-doors, with parts broken away to show how the said doors are stopped in their closed position. Fig. 8 is a detail part plan view of the main frame, showing filling-plates adjusted to position, as may be desired, when the machine is to be used as a drill; and Fig. 9 shows a somewhat different form of shaft used in drilling in connection with the slat-rods used therewith.

The main frame has side bars A A, connected by suitable cross-bars and adapted for the connection of a pole or thills for use with a double or single team. Cross-beams B B' extend between the side bars, the space between said beams forming what may be termed the "discharge-opening," and being divided by a number of slat-rods C, extended between beams B B' and arranged parallel to the sides of the machine. In the inner face of the side bars are formed guide-grooves $a$ for the front and rear regulating-doors D, which doors have near their inner ends shoulders $d$. (See Fig. 7.) These shoulders engage stops $a'$ and limit the inward movement of the regulating-doors, which latter, by reason of forming the shoulders $d$ back from the inner edges of the doors, are capable of being set against each other at their inner ends to completely close the discharge-opening.

The hopper E has side boards E' and end boards $E^2$, the latter being provided with extensions $e$, which project down close to and in front and rear of the cross-beams B B', the edges of such extensions being formed at $e'$ to rest flat against the said cross-beams and so prevent any waste of material between such cross-beams and end boards. These end boards are inclined and the inner edges $b$ of the cross-beams B B' are beveled or inclined correspondingly to the end boards, so that the material to be sowed or distributed will pass freely to the slat-rods.

The shaft F is suitably journaled, and is driven by means of pinion $f$ thereon meshing with gear $g$ on the axle G. This shaft F extends transversely through the hopper and forms an agitator therein, being provided with numerous radial rods or projections H, which operate downward between the slat-rods and serve to disintegrate the material when barn-yard fertilizer is used and force such material through the spaces between the slat-rods.

By means of the regulating-doors the discharge-opening may be partially closed to regulate the discharge of material, or may be entirely closed in loading the machine or in the passage thereof from field to field or otherwise, as may be desired.

The machine as above described is adjusted for broadcast use. The rear board D is engaged and operated by a screw $d$, turning in a threaded bearing at $d^2$. Below the discharge-opening are arranged the drill-boards, consisting, in the construction shown, of two central boards I I and the outer boards K K, all of said boards being hinged on parallel lines, such lines being in the direction of motion of the machine. The boards I I are hinged at their upper edges on the same pintle or otherwise close together, and may be drawn close together at their lower edges and so held by bolts $i$ when desired, as will be hereinafter described. The outer boards K are also hinged at their upper ends and may be adjusted at their lower ends, in connection with the central boards, to drill one or two rows, as may be desired. To this end the boards I K may be adjusted, as shown in Fig. 5, to drill two rows, the boards I being set at their lower ends inward and the boards K being set at their lower ends outward, so that the lower edges of the boards I K are just sufficiently separated to permit the discharge of the seed, fertilizer, &c., as desired.

To fasten the boards I K in the position shown in Fig. 5, there are provided short connecting-bars L, having openings $l$ to receive pins or studs $l'$ on the drilling-boards. To adjust such boards to drill a single row, boards I may be drawn close together and secured by their connecting bolt or bolts $i$, and the boards K be then adjusted in close to the boards I, as shown in Fig. 4, and secured by a longer connecting-bar, as shown in said Fig. 4 and at $l^2$ in Fig. 5.

The coverer for covering the drilled seed comprises the bar M, the drag-rods $m$, connecting the bar M to the machine, so that such bar will be dragged in rear of the machine, and the teeth or blades N, supported on bar M to opposite sides of the center and adjustably secured, so that they may be set, as shown in Fig. 6, to cover when a single row is being drilled, or may be set in a reverse direction to cover two rows, as will be readily understood from said Fig. 6.

It is preferred to hinge the drilling-boards I and K in bars O, which may be conveniently applied to and removed from the framing of the machine when desired.

The machine is provided in advance of the discharge-opening with one or more teeth or openers I'.

In drilling it may at times be desirable to regulate the feed of material to the discharge-opening to prevent any clogging of the drill-boards. To this end I provide the removable boards J, which form a false bottom for the hopper and are placed immediately over the slat-rods, a space being left between the inner edges of such cover-boards J, through which space the material may discharge.

The shaft K' (shown in Fig. 9) has long rods or teeth $k$ projecting radially from it centrally between the sides of the hopper, and is provided with shorter teeth $k'$ between said long teeth and the sides of the hopper. Where desired, this shaft may be used instead of that shown in Figs. 1, 2, 3, and 4.

Bands L L, looped over the hopper and secured by suitable nuts to the frame, serve to clamp the hopper firmly in position.

The operation is simple and will be understood from the foregoing description. The opener or shovel is not used when the machine is used as a broadcast distributer, but only when it is used to drill the material, which, obviously, may be commercial or other fertilizer, seed, or such fertilizer and seed mixed, as may be desired.

Having thus described our invention, what we claim as new is—

1. The combination of the framing, the hopper, the central drill-boards, the side drill-boards, the bolts for holding the central drill-boards together, and the connecting bar or bars, all substantially as set forth.

2. The combination of the framing, the hopper, the drill-boards adjustable, whereby to drill one or two rows, and the coverer running in rear of the drill-boards and having its teeth or blades adjustable, whereby to cover one or two rows, substantially as set forth.

3. In a machine substantially as described, the combination of the drill-boards hinged at their upper edges and provided near their lower movable edges with pins or projections, and connecting-bars extended between said drill-boards and having openings to receive the pins or projections on the drill-boards, substantially as and for the purposes set forth.

4. In a machine substantially as described, the combination, with the main frame having grooves $a$ and stops $a'$ and provided with a discharge-opening, of the regulating-doors sliding in said grooves and having shoulders $d$, arranged to abut said stops, the hopper, and the agitator-shaft, substantially as set forth.

JESSIE ALFRED CHILDS.
WILLIAM EDWARD MUIR.

Witnesses:
J. B. ROSSER, Jr.,
W. G. REBENTISCH.